2 Sheets—Sheet 1.

E. W. TILTON.
Circular-Saw.

No. 197,688.   Patented Nov. 27, 1877.

2 Sheets—Sheet 2.

E. W. TILTON.
Circular-Saw.

No. 197,688. Patented Nov. 27, 1877.

Witnesses
Grenville Lewis
J. McKenny

Inventor
Edward W. Tilton
By Hill, Ellsworth & Spear
His attys.

UNITED STATES PATENT OFFICE.

EDWARD W. TILTON, OF OSHKOSH, WISCONSIN.

IMPROVEMENT IN CIRCULAR SAWS.

Specification forming part of Letters Patent No. 197,688, dated November 27, 1877; application filed August 18, 1876.

*To all whom it may concern:*

Be it known that I, EDWARD W. TILTON, of Oshkosh, in the county of Winnebago and State of Wisconsin, have invented a new and and useful Improvement in Circular Saws; and I do hereby declare the following to be a full, clear, and exact description of the same, reference being had to the accompanying drawings, forming part of this specification.

This invention relates to circular saws; and consists, first, in making that part of the saw between the eye and the periphery thereof partially open, so as to leave arms connecting the outer rim to the central or hub portion of the saw; and, second, in making this saw in two parts, as herein described.

The invention is more particularly adapted to concave circular saws, but may be advantageously applied to those made with plain surfaces.

Figure 1:
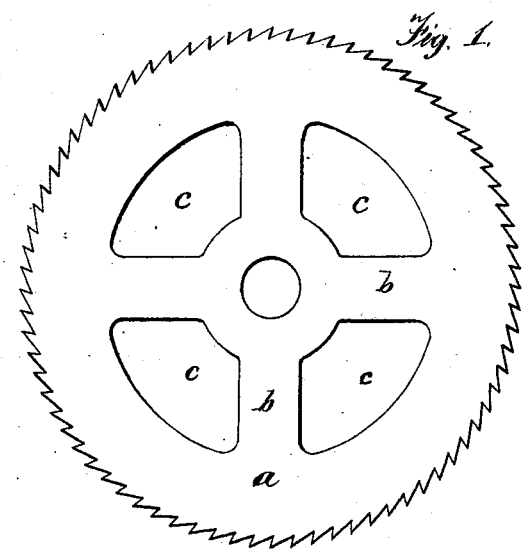

In the drawings, the side of the saw is represented in Figure 1 with the solid portion *a*, which constitutes what may be called the "rim" of the saw, and on which the teeth are made with like solid portions *b b b b*, connecting the rim to the central part, in which is the ordinary eye.

Figure 2:

Fig. 1 shows four openings, *c c c c*, though more may be used if deemed desirable. I consider four or six preferable, but do not limit myself to that number. The same parts are shown in Fig. 2, which also illustrates the concave form of saw.

Circular saws made in this way can be made much easier and more perfectly than when made entire of continuous sheets of metal, and they run with less friction.

Figure 3:
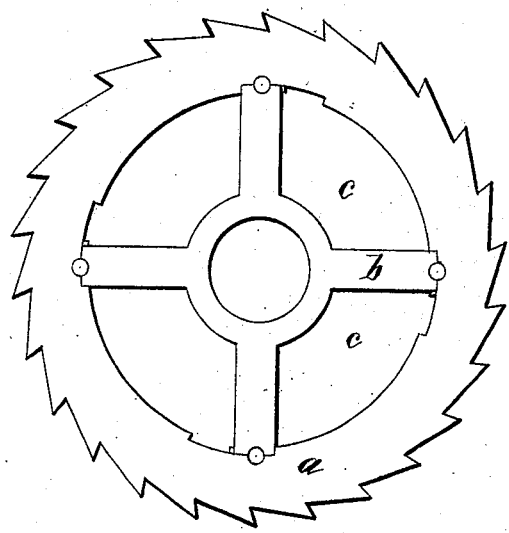
Figure 4:

This saw may be made, if desired, in two parts, as shown in Figs. 3 and 4 of the drawings. In this modification the openings are formed between the radial arms of the inner part of the saw. This inner part is connected to the outer rim in any convenient manner, and the outer rim, when worn, may be removed and another substituted in its place.

In the figures I have shown the rim with the inner edge cut to form recesses corresponding to the arms, the ends of which are made to fit therein. The inner edge of the rim, on one side of the recesses, I form of a V shape, and make the outer ends of the arms with corresponding grooves. The parts are then put into place in the recesses, and by a slight turn are fitted securely together. They may be held in place by a hole made half in the rim and half in the end of the arms, and a swivel inserted therein. This is shown in section in Fig. 5.

I am aware that it is not new to form a circular saw with radial slots, nor do I here claim such radial slots in connection with a solid hub.

I claim as my invention—

1. A circular saw made with openings, leaving a central part, in which is the eye, connected to the rim by radial arms *b b*, as set forth.

2. A circular saw having central parts, radial arms, and a removable rim, as set forth.

3. A circular saw having radial arms and a removable rim, the arms and rim being united in the manner set forth.

EDWARD W. TILTON.

Witnesses:
C. R. NEVITT,
R. H. NEVITT.